UNITED STATES PATENT OFFICE.

THOMAS MADELEY, OF ROCHESTER, NEW YORK.

IMPROVEMENT IN ARTIFICIAL STONE.

Specification forming part of Letters Patent No. 114,577, dated May 9, 1871.

I, THOMAS MADELEY, of Rochester, in the county of Monroe and State of New York, have invented a certain Improvement in Artificial Stone, of which the following is a specification:

My invention relates to a mixture of certain articles herein specified, possessing such characteristics as to produce a superior artificial stone for building purposes, flagging, drain-tile, &c.

In the preparation of artificial stone several peculiar qualities have to be obtained which most of the mixtures now in use do not possess. It must be sufficiently tough to resist sudden blows, and at the same time sufficiently brittle to be readily dressed. It should be water-proof, but porous enough to unite readily with mortar, and the exposed face close-grained enough to prevent too great an absorption of moisture from the atmosphere.

To accomplish these objects I propose to use in the preparation of my improved composition the following ingredients: gas-tar, gravel or sand, or both, Rosendale or other similar quick-setting cement, water-lime, rosin, and pulverized brimstone or sulphur. The gas-tar is usually heated to the boiling-point, the rosin added and stirred in, after which the other articles named may be added till the mixture is sufficiently thick, and while hot poured into molds of any required form.

In this compound the gas-tar and water-lime seem to impart to it water-proof qualities, the rosin and cement the adhesiveness of particles, while the gravel gives it body and hardness.

I find also that the brimstone imparts to the stone a peculiar brittleness, which does not, however, counteract the action of the resin and cement, but renders it capable of being readily chipped and dressed.

When cast in smooth-faced molds the brimstone apparently causes it to receive a remarkably smooth hard surface, well adapted to resist the action of the weather.

By the union of water-lime and Rosendale cement a hard, quick-setting, and almost impervious article is produced, while the addition of the rosin to the coal-tar imparts to it a brittle character, which is an essential feature, since it readily permits the stone to be chipped and fitted snugly in its place.

The proportions of the above-mentioned ingredients may be varied to suit the different localities in which the compound is used; but I find by experiment that a very good proportion for general purposes is as follows: fifty parts, by weight, of gravel or sand, five of gas-tar, twenty of Rosendale cement, thirty of water-lime, five of rosin, and one of brimstone.

It may be advantageous in some instances to add two to ten parts of plaster-of-paris, which gives the product body and a finer grain, but it is not essential.

What I claim as my invention is—

The compound for artificial stone herein described—that is to say, gravel or sand, Rosendale cement, water-lime, rosin, and sulphur or brimstone, in or about the proportions specified.

THOMAS MADELEY.

Witnesses:
 F. H. CLEMENT,
 A. H. SARGENT.